M. I. BOYD.
DEVICE FOR WHIPPING CREAM, EGGS, AND OTHER MIXTURES.
APPLICATION FILED FEB. 7, 1914.
1,116,230.　　　　　　　　　　　　　　　　Patented Nov. 3, 1914.
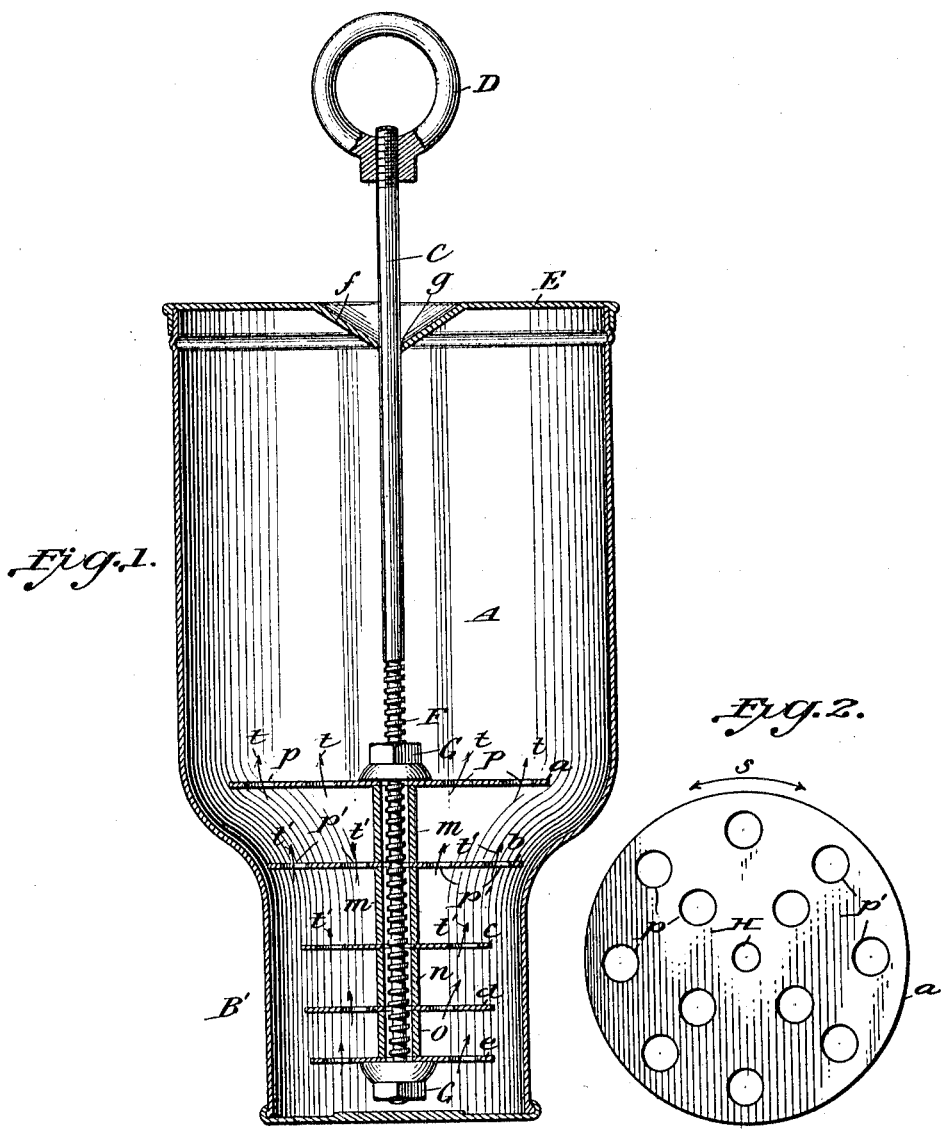

UNITED STATES PATENT OFFICE.

MARTHA I. BOYD, OF WOOSTER, OHIO.

DEVICE FOR WHIPPING CREAM, EGGS, AND OTHER MIXTURES.

1,116,230.  Specification of Letters Patent.  Patented Nov. 3, 1914.

Application filed February 7, 1914. Serial No. 817,351.

*To all whom it may concern:*

Be it known that I, MARTHA I. BOYD, a citizen of the United States, residing at Wooster, in the county of Wayne and State of Ohio, have invented a new and useful Device for Whipping Cream, Eggs, and other Mixtures, of which the following is a specification.

My invention relates to improvements in devices for whipping or beating cream, eggs, mayonnaise, and other culinary mixtures; and its object is to provide a simple and inexpensive device, adapted to be adjusted to meet the requirements of a variety of mixtures, and different quantities of each, and to vary the agitation of the same within the jar or the vessel containing such mixture.

It consists of the several novel elements and combination of parts hereinafter set forth, and stated in the appended claim.

It is illustrated by the accompanying drawing in which similar letters of reference indicate like parts.

Referring thereto, Figure 1 is a view of my invention in vertical section, and Fig. 2 is a plan view of one of my adjustable disks, detached.

In the drawings Fig. 1 shows a metal jar, such as I use, cut in two from top to bottom, exposing therein my improved combination dasher in vertical position. Said jar comprises two parts which merge into each other; the upper part A is enlarged to accommodate large quantities of mixture and afford easy access by hand to its interior; the lower portion B is narrowed to accommodate small quantities of mixture, so as to give sufficient depth for whipping or beating purposes. A dasher arm C extends vertically through the longitudinal center of the jar, and through a removable lid E in the well known manner of dasher churns, and terminates above the jar in a suitable ring or handle D which is preferably threaded thereon.

A concave depression $f$ surrounds the orifice $g$ to prevent the overflow of mixture during its agitation by vertical movement of said dasher. Said dasher arm is threaded, as at F, about half its length, to provide room for shifting the horizontal circular disks, $a$, $b$, $c$, $d$, and $e$ by means of the nuts G, as shown in Fig. 1. Said disks are each provided with a series of perforations $p$, and a central orifice H, the latter being adapted to admit the dasher arm C; and said disks are supported and held apart in horizontal position on said dasher arm by means of collars $m$, respectively, the length of which may be varied to lessen or increase the spaces between adjacent disks, as at $n$, $o$, to suit different mixtures; and the several disks are solidly secured in their respective positions by nuts G. Disks of larger diameter, as $a$ and $b$, are located on said threaded space F adapted to the larger diameter of the jar A, and disks of smaller diameter, as $c$, $d$, and $e$, are located so as to actuate within the lower part of said jar having a smaller diameter; and the entire series of disks may be distributed upon said arm at any desired distance from the bottom of said jar or from the top thereof within the limits of said threaded part of said arm, so as to suit the dasher to the kind of mixture to be beaten or whipped by its vertical movement. Moreover, by means of said removable disks, those having different sized perforations may be used interchangeably, and thus adapted to different kinds of mixtures, and finally, by loosening said nuts slightly, the different disks may be so rotated and adjustably secured as to set their several perforations $p$ $p$ either into or out of alinement with the adjacent disks of the series as shown at $p'$ and by the arrows $t$ $t'$.

By means of the jar, shaped as aforesaid, and dasher provided with the series of variable and adjustable disks secured thereon as aforesaid, a very useful article of manufacture for the purposes aforesaid is obtained, adapted to whip or beat a variety of culinary articles, and in any desired quantity, and the parts may be readily separated for changes or for washing as may be required.

I am aware that it is not new to use a dasher vertically operable in a vessel for beating and for churning, having one or more spaced apart disks at or near its lower end, and such I do not broadly claim, but limit myself to the particular construction of a two-part vessel, the parts having different diameters, and of adjustable disks having corresponding diameters, reciprocally operable within said parts, respectively, as set forth and claimed.

What I claim as new and desire to secure is—

A device of the character described, comprising, in combination, a vessel made up of two cylindrical parts, one above the other, the upper part having a longer diameter than the lower, said parts solidly united together endwise by an intermediate portion; a perforated cover on said upper part; a dasher-arm operable through said cover and within both said parts; one or more perforated disks mounted on said arm so as to fit and be reciprocably operable within the larger diameter of said vessel; one or more perforated disks mounted on said arm so as to fit and be reciprocably operable within the smaller diameter of said vessel; and means, including a series of collars on said arm between each pair of disks, for adjustably and removably securing the latter in their relative positions on said dasher-arm so as to be operable within said two cylindrical parts, respectively, simultaneously, substantially as set forth.

In witness whereof, I hereunto set my hand this 14th day of January, A. D. 1914.

MARTHA I. BOYD.

In presence of—
 CHARLES C. JONES,
 HIRAM B. SWARTZ.

---

Copies of this patent may be obtained for five cents each, by addressing the "Commissioner of Patents, Washington, D. C."